United States Patent
Arcand

[11] Patent Number: 5,845,412
[45] Date of Patent: Dec. 8, 1998

[54] TAPE ADAPTER WITH INTERCHANGEABLE BRACKETS

[76] Inventor: Stephane Arcand, 252 Wilma St. Apt. 2 Sudbury, Ontario, Canada, P3A-1A2

[21] Appl. No.: 725,991

[22] Filed: Oct. 4, 1996

Related U.S. Application Data

[63] Continuation-in-part of Ser. No. 394,365, Feb. 24, 1995, abandoned.

[51] Int. Cl.$^6$ ...................................................... G01B 3/10
[52] U.S. Cl. .............................................. 33/758; 33/770
[58] Field of Search .............................. 33/758, 760, 768, 33/770

[56] References Cited

U.S. PATENT DOCUMENTS

| | | | |
|---|---|---|---|
| 2,574,272 | 11/1951 | McCully | 33/770 |
| 2,711,030 | 6/1955 | Drew et al. | 33/758 |
| 3,021,599 | 2/1962 | Odom | 33/760 |
| 4,766,673 | 8/1988 | Bolson | 33/760 |
| 4,924,597 | 5/1990 | Tursi | 33/758 |
| 5,406,711 | 4/1995 | Graham | 33/770 |

FOREIGN PATENT DOCUMENTS

| 120902 | 7/1992 | Japan | 33/758 |
|---|---|---|---|

*Primary Examiner*—Thomas B. Will
*Attorney, Agent, or Firm*—Gipple & Hale; John S. Hale

[57] ABSTRACT

A tape adapter with a detachable bracket, comprising: a tape adapter formed with a base, a front face wall secured to one end of the base, a plurality of side walls secured to the base and the front face wall and a back wall secured to the base and side walls to form a chamber for receiving a tape blade of a tape measure. A detachable bracket comprising a bracket plate and a flange member with a fastener member is secured bracket plate and is removably attached to the base of the tape adapter. The measuring tape blade of a tape measure is secured inside the chamber defined by the tape adapter walls to attach the tape adapter to the tape measure blade.

16 Claims, 10 Drawing Sheets

TAPE ADAPTER WITH INTERCHANGEABLE BRACKETS

This application is a continuation-in-part of application Ser. No. 08/394,365, filed Feb. 24, 1995 now abandoned.

FIELD OF THE INVENTION

The present invention relates in general to devices that aid the user of a tape measure in taking measurements. Specifically, the invention is directed to a device secured on an end of the measuring tape and to devices with interchangeable fastening hardware. The present invention relates to a device that can secure one end of a measuring tape to a variety of different structures and surfaces to facilitate the taking of measurements.

BACKGROUND OF THE INVENTION

Tape measures are commonly used to take measurements of various articles under a variety of conditions. Individuals frequently measure distances greater than an arms length so a need exists for an effective and versatile way to anchor one end of the measuring tape so the tape can be extended to the length necessary to take the measurement. The typical tape measure incorporates a short blade at the end thereof which is of limited usefulness in securing the end of the tape and which easily becomes dislodged from the object to which it is mounted or secured.

A number prior art patents reveal numerous attempts to create mechanisms for securing a tape end and various devices which can be mounted to a tape measure housing. Examples of such attempts are disclosed in U.S. Pat. No. 2,574,272 to McCully issued Nov. 6, 1951; U.S. Pat. No. 2,663,941 to Dart issued Dec. 29, 1953; U.S. Pat. No. 2,711,030 to Drew et. al. issued Apr. 19, 1954; U.S. Pat. No. 3,036,791 to Siggelkow issued May 19, 1962; U.S. Pat. No. 3,021,599 to Odom issued Feb. 20, 1962; U.S. Pat. No. 4,766,673 to Bolson issued Aug. 30, 1988; U.S. Pat. No. 4,924,597 to Tursi issued May 15, 1990; U.S. Pat. No. 5,406,711 to Graham issued Apr. 18, 1995; and Japanese Patent Number 59-120902(A)to Nishimura issued Dec. 7, 1984.

U.S. Pat. Nos. 2,663,941 and 3,036,791 are directed to measuring tape housings having tape ends which are secured with magnetic holders while Japanese Patent Number 59-120902(A) is directed toward a linked end assembly with the end member of the linked assembly having a permanent magnet mounted thereto.

Conversely U.S. Pat. No. 2,574,272 shows a hinged tab designed to be used on the end of a steel tape that can be opened from a folded position substantially parallel to the tape to an open locked position that is substantially perpendicular to the tape. The tab when folded may move lengthwise on the tape, and may include a key portion that permits it to be erected only as its proper working position at the end of the tape.

Various attachments to a tape measure are disclosed by U.S. Pat. No. 2,711,030 which discloses a suction cup pivotally attached to one end of a measuring tape; U.S. Pat. No. 3,021,599 shows a combination tool to aid in taking measurements with a tape measure comprising a casing having a flat, elongated base. The casing carries sighting means defining a line of sight parallel to the length of the base. The tool includes a target unit which can be secured to a reference point to hold the end tab of the tape another U.S. Pat. No. 4,766,673 discloses a tape measuring system having a housing which is provided with a pencil sharpener, a pencil trimming means (a drawknife) mounted in another corner portion of the housing which is intended to trim a square type of lead pencil used in carpentry, a snap in pencil holding part located at another lateral side of the housing, a recessed area on the face of the housing to accept a memo pad and a belt clip disposed on the rear side of the housing. Because these features are all built into the housing, the features cannot be removed from the tape measuring device or altered to meet the specific requirement.

The present invention overcomes these limitations by providing the user with removable hardware to use in conjunction with the measuring device and also makes these features fully adjustable by the user.

Another related U.S. Pat. No. 4,924,597 discloses a tape measure device which features a housing or casing which has a variety of different mounting devices attached thereto including a suction cup assembly which includes a suction cup that is attached to the casing by a retractable cord, the assembly fits into a chamber defined in the casing when the suction cup is not in use. The device further includes magnets and a nail-receiving bore as well as a clip for mounting the device on the user's belt.

U.S. Pat. No. 5,406,711 discloses an assembly which uses a measuring tape for marking and cutting a straight line on an upper surface of the work piece. The measuring tape has an engagement tongue protruding from the leading edge of the tape and a reel lock for fixing the tape in a locked position when the tape is extended from the case. A hand tool, such as a knife or marking implement, works in cooperation with a guide and an engagement slot. The tongue of the measuring tape engages the slot of the hand tool, thereby connecting the hand tool to the tape. The device is bulky and difficult to use.

The present invention provides a much more streamlined structure making it easy to use the blade guide feature on a vertical or horizontal surface by one person and also does not depend on a bulky attachment to the casing of the tape measure as the '711 device does.

The means for attaching the blade to the present invention is also greatly improved because the blade guide of the present invention provide a unique slot structure which makes the blade more controllable and keeps the blade in better alignment.

The present invention was developed to provide the user with a set of detachable hardware for use with standard tape measures with various tape widths and housing sizes to aid the user in making and recording measurements and in cutting objects with precision. The prior art lacks the versatility, removability and portability of the present invention. The invention is comprised of an inventive adapter that can be removably secured to the end of a tape measure without the use of hand tools and a plurality of detachable brackets that fit on the adapter and provide the user with suction cup means, pin or hook means, or blade guide to facilitate the taking of measurements. A removable pad holder is also disclosed which can be used in conjunction with this hardware.

SUMMARY OF THE INVENTION

The inventive tape adapter with interchangeable brackets of the present invention is comprised of a tape adapter which mounts on the tip or blade of any standard tape measure and includes a plurality of interchangeable bracket members which are fastened to the tape adapter to enhance the functionality of any standard tape measure. The typical tape measure includes a thin, flexible, narrow steel tape which has a slight upward transverse curvature and typically retractably unrolls from a slot in a compact housing. The curvature is provided to give the unsupported extended steel tape a structural degree of strength and stability when the tape is not supported along its length. However, the slight transverse curvature does not provide the steel tape with enough structural stability to enable the tape to remain straight when measuring large distances. Consequently, the user of a steel measuring tape frequently must find a way of removably attaching the free end of the steel tape to a point on the object being measured.

The standard steel measuring tape is provided with a short metal end flange which serves the dual function of preventing the free end of the steel tape from entering the housing of the tape measure through the slot in the housing when retracted and providing the user of the tape measure with a means of securing the free end of the steel tape to the object being measured. The flange or blade is frequently inadequate to secure the tape to the object being measured, particularly when the distance being measured is beyond or longer than the arm's reach of the person taking the measurement or when the tape is suspended above the surface being measured and therefore not supported by a flat surface as typically happens when the dimensions of a room are being measured and the end of the tape is secured to a board or the edge of a wall of the room.

The inventive tape adapter of the present invention solves these and other problems by providing the tape measure user with a means of removably attaching a plurality of adapters to the end of the tape so that the same can be used to securely attached the end to a wide variety of objects and surfaces. Each bracket is capable of secure attachment to a wide range of materials so that the user can quickly modify the tape for attachment to practically any object or surface the user is likely to encounter. Brackets can accommodate many means of tape attachment including suction cup members, hook members, and pin members; and, the adapter can also be easily fitted with various brackets which can be used to removably attach a knife or blade member to the end of a steel measuring tape so that the blade can be used in conjunction with the steel tape to cut or score an object using the tape as a guide to ensure accurate cutting. The invention also provides the user of a standard steel tape measuring device with a means for recording the measurements taken with tape by providing appropriate structures on the side of the casing to accommodate note paper, pencils and inventive scoring devices for scratching or scoring the object being measured to record a location on the object.

Accordingly, it is an objective of the present invention to provide the user of a steel measuring tape with an adapter and interchangeable bracket assemblies which can be used to attach the tape to a wide variety of surfaces including relatively smooth steel, glass, wood, rough lumber or finished wall board or plaster.

It is an object of the present invention to define a tape adapter with interchangeable bracket assemblies that facilitates the use of any standard tape measure which can be securely attached to a broad variety of different surfaces or objects of various dimensions.

Another object of the present invention to define a tape adapter which can accommodate a suction cup member which can be used to attach the tape end to relatively smooth surfaces.

It is yet another object of the present invention to define a tape adapter which can be provided with a utility knife bracket which can accommodate a knife blade so the tape can be used to guide the blade when the user is cutting various items including wall board, ceiling tile or insulation.

Still another object of the present invention to provide a tape adapter with a means for attaching a hook bracket or a pin bracket or similar type of bracket to enable the user to secure the tape to the object being measured.

A further object of the present invention is to provide the user of a tape measure with an adapter and a plurality of bracket assemblies so that the user is provided with a tongue located at the bottom of each bracket which acts as a tape attachment means in order to accommodate any measurement that is taken on a cornered edge or 90 degree angle.

Yet a further object of the present invention to define a tape adapter and bracket for use with the adapter such that bracket can rotate relative to the adapter to change the angle the tape forms with a reference surface on the object being used to enable the user to make measurements at various angles.

Another object of the present invention is to define a plurality of embodiments of pad and marking tool holders which can be mounted on any standard 12, 16 or 25 foot tape measure housing and which also optionally provides a pencil sharpener.

In the accompanying drawings, there is shown an illustrative embodiment of the invention from which these and other objectives, novel features and advantages will be readily apparent.

DETAILED DESCRIPTION OF THE INVENTION

The inventive tape adapter and the plurality of inventive tape adapter brackets are generally shown FIGS. 1 through 21. The best mode and preferred embodiment of the pad holder and pencil device is shown in FIGS. 22 through 26. The preferred embodiment of the tape adapter with interchangeable brackets is shown in FIGS. 1 through 21, while the inventive notepad and pencil holder with sharpener is generally shown in FIGS. 22 through 26.

Figure 1:
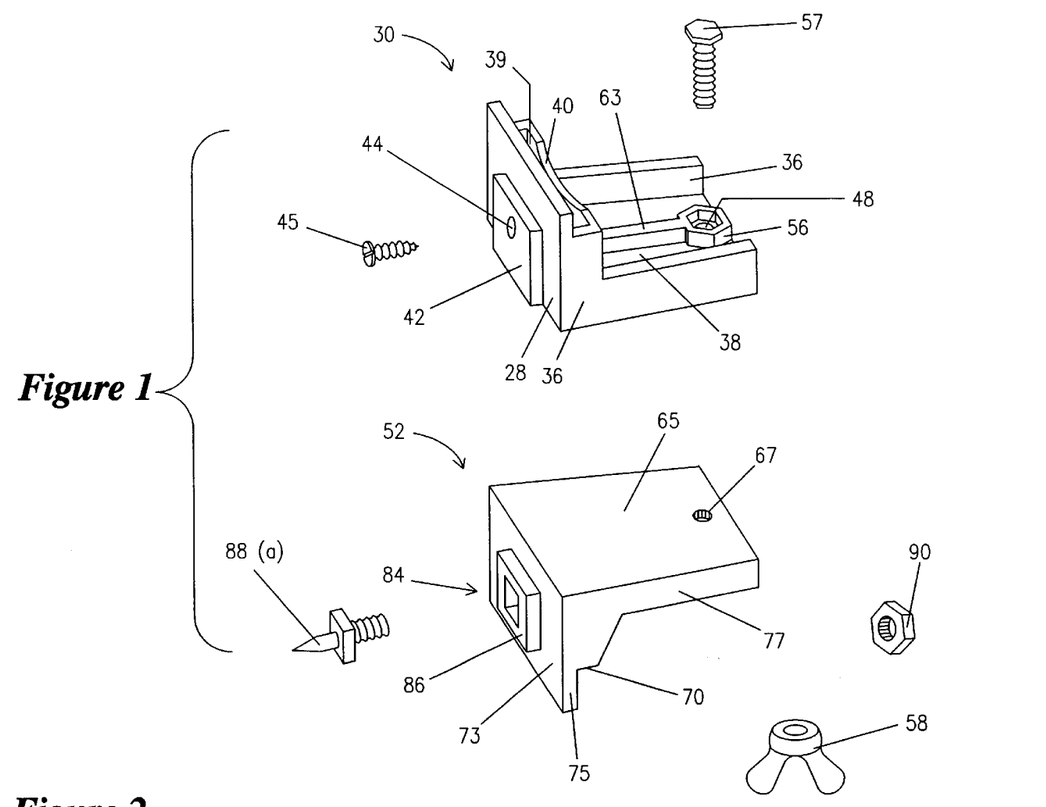
FIG. 1 shows an exploded front perspective view of an embodiment of the tape adapter and bracket of the present invention.
Figure 2:
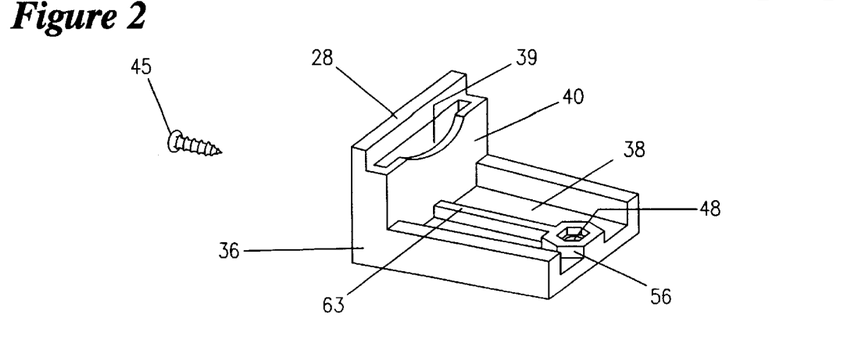
FIG. 2 is a rear perspective view of the tape adapter shown in FIG. 1.

As shown in FIGS. 1 and 2 the tape adapter 30 has a front face wall 28 which is secured to and extends from the base or bottom plate 38. A pair of side walls 36 are secured to and help reinforce the front face wall 28 and also extend from the base 38. The front face wall 28, the side walls 36, base 38 and back wall 40 cooperate to form a chamber 39 that is designed to receive the blade of a steel tape of a tape measure. An extension block 42 formed on the front face wall 28 has a screw hole 44 to receive a self-tapping screw 45. A tape measure blade is held within the chamber 39 by tightening the self tapping screw 45 so that the blade of the tape is held firmly between the back wall 40 and the tip of the screw 45. The base 38 of the tape adapter 30 is provided with an aperture 48 which is used to secure the tape adapter 30 to one of a plurality of brackets generally designated as 50, 52, and 54 and shown in FIGS. 3, 4, and 5 respectively. The tape adapter 30 is also provided with a plurality of ribs on the base 38. A hexagonal rib configuration 56 surrounds the aperture 48 and is dimensioned to receive the head of the bolt 57 and prevent the bolt 57 from rotating when the wing nut 58 is placed around bolt 57 and tightened. A central rib 63 extends longitudinally down the central portion of base 38 from the hexagonal ribbing 56 to the back wall 40. If desired the entire structure can be integrally cast or injection molded.

Figure 3:
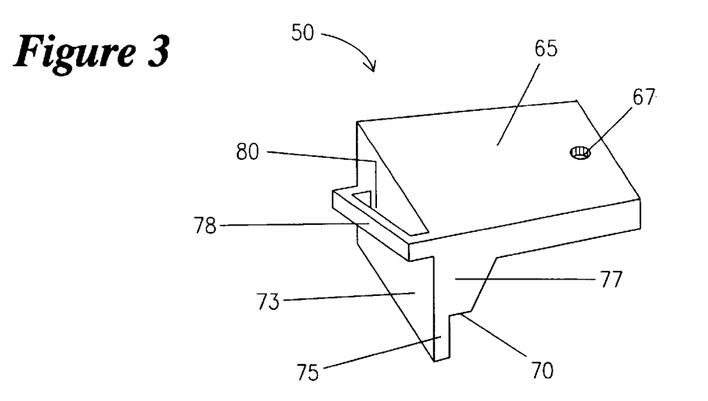
FIG. 3 is a perspective view of a utility knife bracket embodiment used with the tape adapter of FIG. 1.

The tape adapter is secured to the blade or flange on the end of the steel tape and then any one of a plurality of tape adapter brackets is attached to the tape adapter. FIG. 3 shows a utility knife bracket 50. The utility knife bracket is constructed with a top plate 65 and a front plate 73 oriented substantially perpendicular thereto. The top plate 65 has an aperture 67 to receive a bolt 57 allowing the bracket 52 to be pivotally attached to the tape adapter 30. The interior surface of the top plate is reinforced with ribbing structures in a manner similar to that used to reinforce the tape adapter 30. Side walls 77 are formed integrally with the top plate 65 and the front plate 73 and located on each side of the adapter. The side walls are constructed to form a pair of identical lateral supports 70 on each side of the front plate 73. A tongue member 75 is also integrally formed with the front plate 73. The lateral support 70 and the tongue 75 cooperate to secure the end of the steel measuring tape to a cornered edge of a surface. The utility knife bracket further incorporates a knife holder bar 78 which extends angularly across the front plate 73. The knife holder bar as mounted on the front plate forms a slot 80 to receive and hold a utility knife blade so that the steel tape can be used to guide the knife blade to make an accurately measured cut in the material being measured. The slot 80 is designed to accommodate a standard utility knife and acts as a guide and firmly secures the knife blade to keep it from swerving. This bracket enables the user to cut a wide variety of different materials such as wall board, ceiling tile and insulation without having to use a straight edge.

Figure 4:
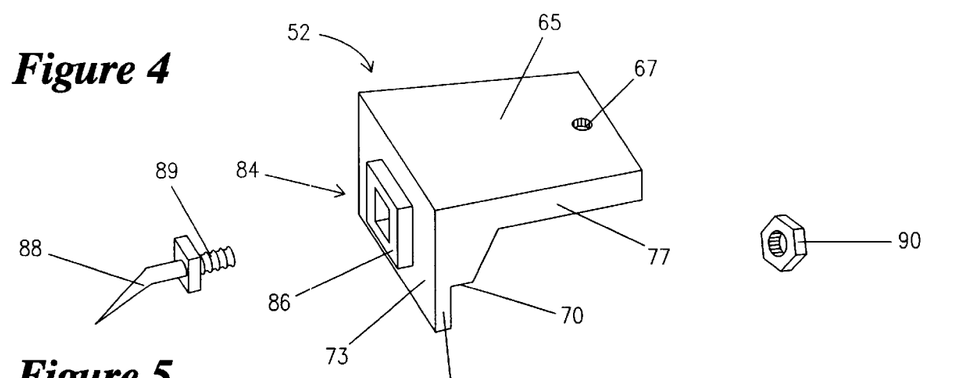
FIG. 4 is a perspective view of a hook bracket embodiment used with the tape adapter of FIG. 1.

Another bracket designated as a hook bracket 52 is shown in FIG. 4. The hook bracket 52 and the utility knife bracket 50 have a similar structure except that the front plate of the hook bracket incorporates a thoroughgoing aperture 84 (not shown) located in the center of the area of the front plate surrounded by the square ribbing 86. The aperture receives the threaded portion 89 of the hook 88 which is long enough to extend through the front plate to threadably receive the nut 90 to secure the hook 88 to the front plate 73. The square ribbing 86 snuggly receives the bolt portion of the hook 88 to prevent the hook from rotating when in use or when nut 90 is threaded on the hook. The hook is constructed of steel and undergoes a baking process in order to harden the tip. The tip is designed to be used on a wide range of materials and surfaces including lumber and wall board to aid the tape user in taking a measurement that is beyond an arm's reach.

Figure 5:
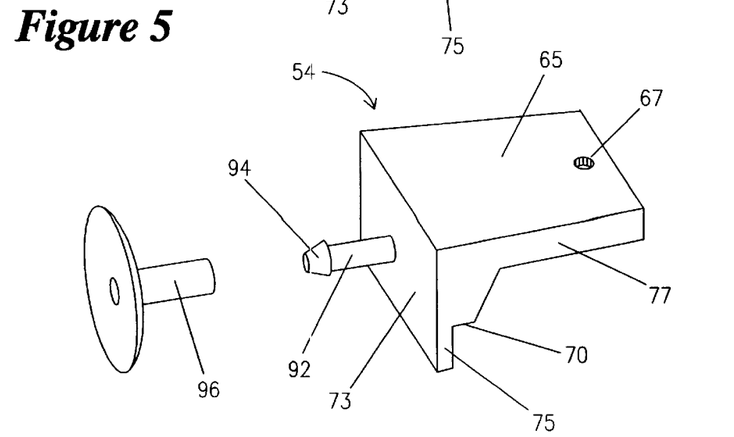
FIG. 5 is a perspective view of a suction cup bracket assembly embodiment used with the tape adapter of FIG. 1.
Figure 6:
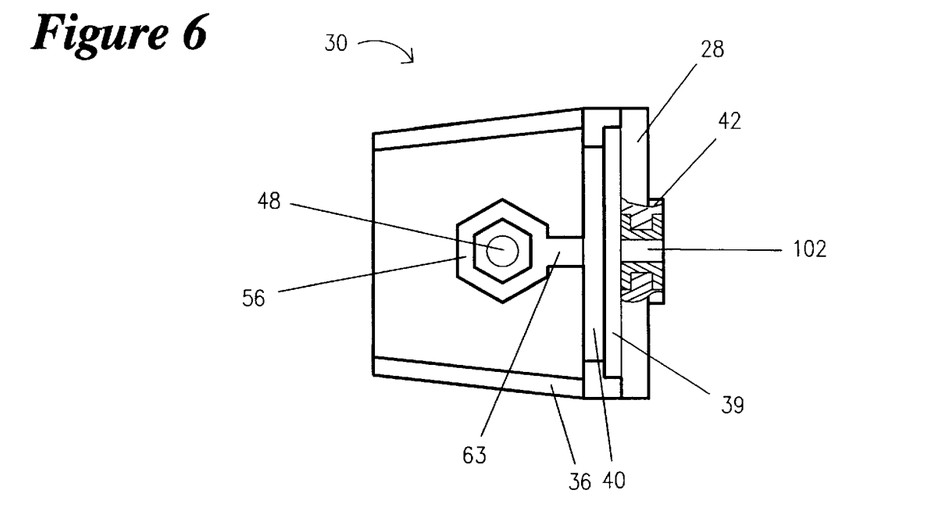
FIG. 6 is an enlarged top plan view of the preferred of the tape adapter with a partially cut away portion revealing the details of the insert incorporated in the front of the adapter.

Another bracket is embodied in FIG. 5 and shows a suction cup bracket 54. This suction cup bracket 54, the utility knife bracket 50 and the hook brackets 52 all have similar structures except that the suction cup bracket has a support shaft 92 defining integrally formed conical support shaft tip 94 on the front plate 73 to detachably engage and hold suction cup 96. The suction cup assembly is used to secure the end of the steel tape to any flat relatively smooth surface on which a suction cup can be affixed. When taking a measurement with the suction cup assembly installed in the adapter, the user simply subtracts one half inch from the measurement indicated on the tape to compensate for the added length of the suction cup 96 and support shaft 92.

Figure 7:
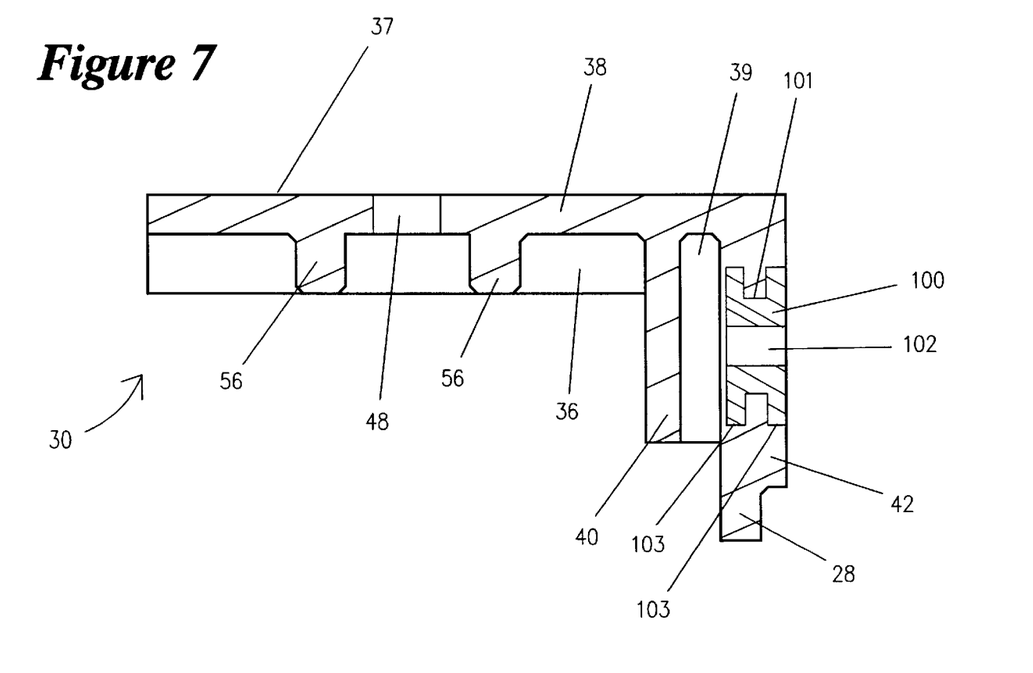
FIG. 7 is an enlarged cross section side view of the preferred embodiment of the tape adapter taken along line 7'—7' of FIG. 6.
Figure 8:
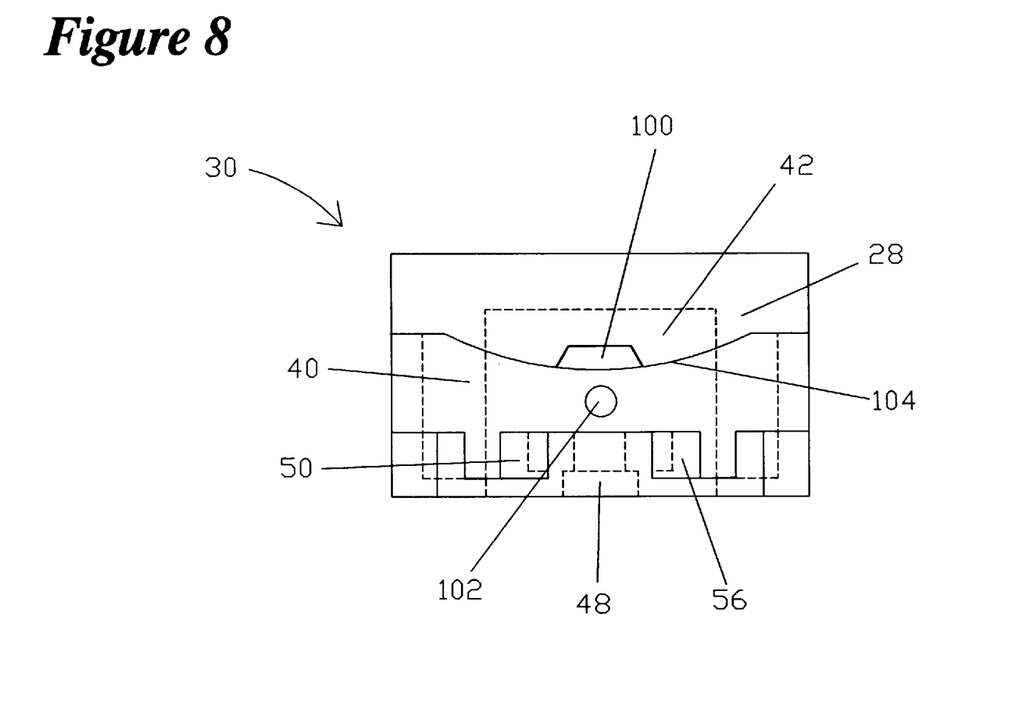
FIG. 8 is an enlarged rear view of the tape adapter with sections shown in phantom.
Figure 9:
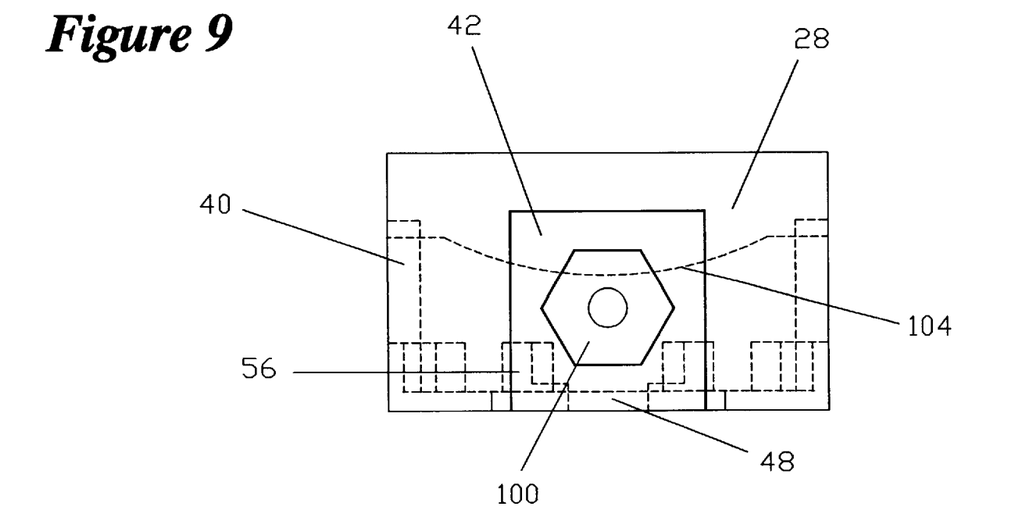
FIG. 9 is an enlarged front view of the tape adapter with sections shown in phantom.
Figure 10:
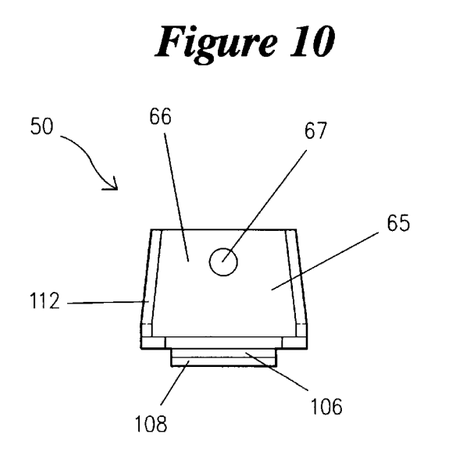
FIG. 10 is a top plan view of the utility knife holder bracket shown in FIG. 3.
Figure 11:
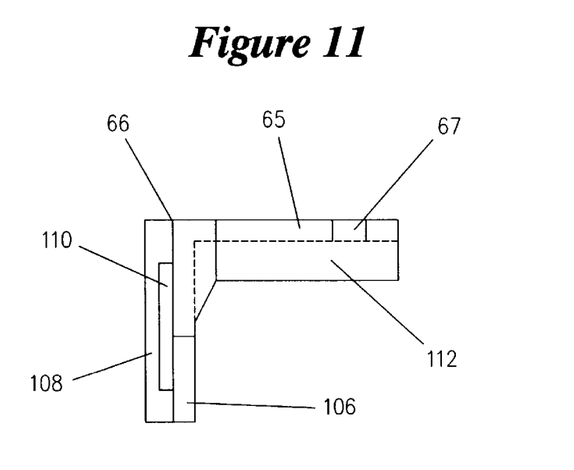
FIG. 11 is a side plan view of the utility knife holder bracket.
Figure 12:
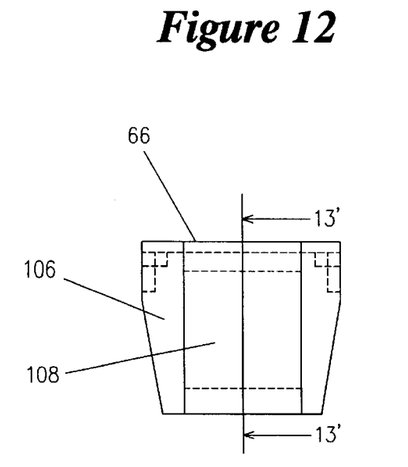
FIG. 12 is a front elevational view of the utility knife holder bracket.
Figure 13:
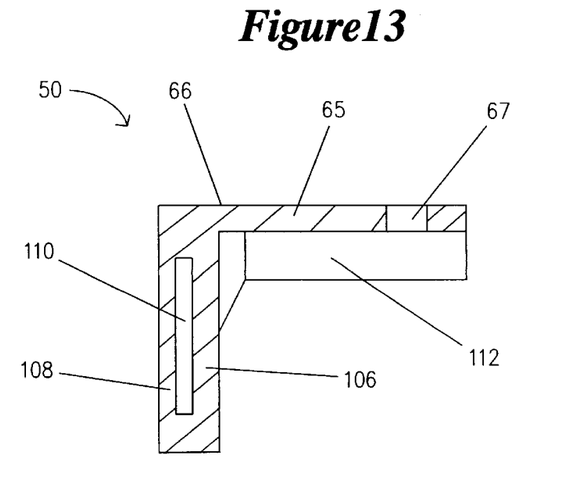
FIG. 13 is an enlarged partially cut away side plan view of the preferred embodiment of the utility knife holder bracket taken along the line designated 13'—13' of FIG. 12.

The adapter embodiment shown in FIGS. 6–9 has a tapered bottom or base plate 38 defining aperture 48, hexagonal ribs 56 surrounding the operative and center rib 63. The back wall 40, lateral walls 36 and front face wall 28 cooperate to form the chamber 39 to receive the tape blade. This embodiment of the adapter incorporates a molded-in insert 100 extension block 42 in the front face wall 28. The insert 100 is a metal milled steel insert with a threaded thoroughgoing bore to receive a threaded rod to bias the tape blade against the back wall 40. The insert 100 can be made of various materials. The insert generally comprises a short central cylindrical portion 101 between two hexagonal planar members 103. The insert has a countersunk thread entry on both ends of the bore 102 with 4–40 UNC-2B thread to threadably engage a standard commercial zinc plated 4–40 UNC-2A grade machine screw. The preferred material for the insert is a machined mild steel made from 5/16" A/F hex bar stock with minimum U.T.S. equal to 55,000 P.S.I., an example of which is C12L14. The insert 100 is designed to be incorporated into an embodiment of the adapter made of plastic by molding the insert into front face plate. Therefore, this embodiment no longer has a self-tapping screw and instead has a screw that goes into the insert. The exact orientation of the profile of the hexagonal planar portion of the insert 100 that resides on the front face wall 28 of the adapter does not matter. It is necessary, however, that the longitudinal axis or the thread form of the aperture 102 be substantially perpendicular to the surface of the back wall 40 that is directly across from the aperture 102 on the interior of the chamber 39 as shown in FIG. 7. FIGS. 8 and 9 show that the back wall 40 has an accurate depression 104 to accommodate the curvature of the standard steel tape. The adapter 30 is preferably made of high impact A.B.S. plastic with optional U.V. stabilizers. The surface designated 37 in FIG. 7 preferably has a matt finish.

The internal structure of the utility knife bracket 50 is shown in FIGS. 10 through 13. The front plate 106 is tapered and accommodates a blade retention plate 108 which cooperates with the plate 106 to form a transverse blade slot 110. Truncated lateral side walls 112 are secured to both the front plate 106 and the top plate 65. In this embodiment of the utility knife bracket the slot 110 orients the blade so that its length extends side to side across the front of the plate 106 instead of diagonally across the front plate as in the embodiment shown in FIG. 3. This positioning of the blade makes it easier for the user to cut or score material to length while guiding the blade with the steel tape of the tape measure. This bracket, like all of the brackets can be pivotally attached to the adapter by a variety of means including by way of example bolts with hexagonal or wing nuts. The preferred material is a high impact A.B.S. plastic with optional U.V. stabilizers. The bracket has a gloss finish (SPCI-2 to SPCI-3) except on the surface designated 66 in FIGS. 10 through 13 which has a matt finish with approximately the equivalent of a 220 grit abrasive paper.

Figure 14:
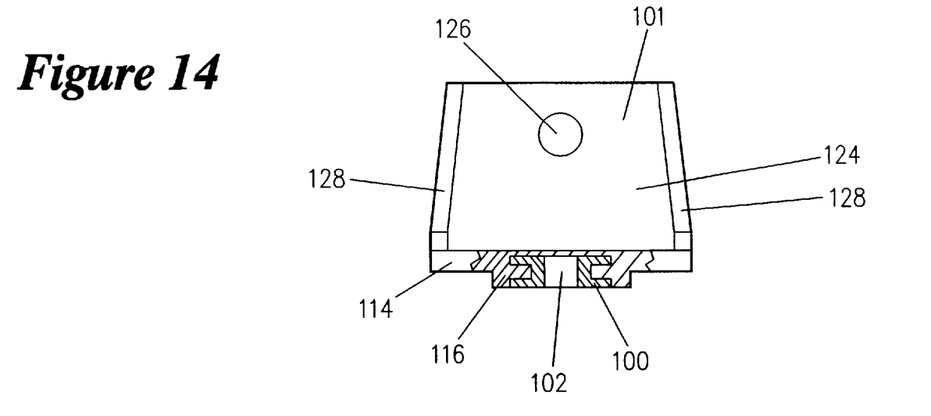
FIG. 14 is an enlarged top plan view of the pin bracket with a partially cut away portion in the front showing details of the insert incorporated in the bracket.
Figure 15:
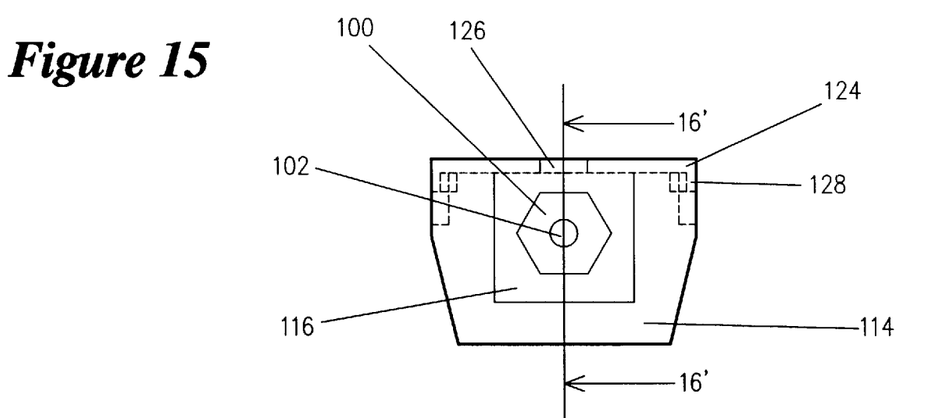
FIG. 15 is an enlarged front elevational view of the pin bracket of FIG. 14.
Figure 16:
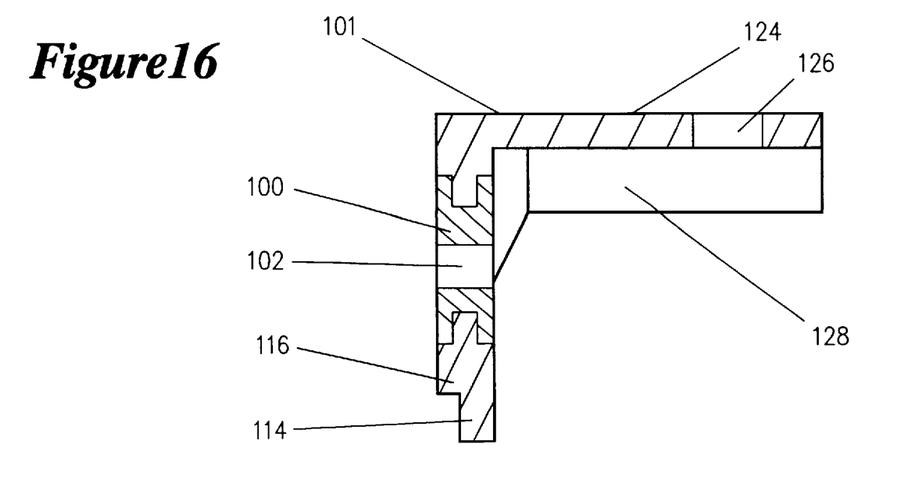
FIG. 16 is an enlarged cut away side view of the preferred embodiment of the pin bracket taken along the line 16'—16' of FIG. 15.
Figure 17:
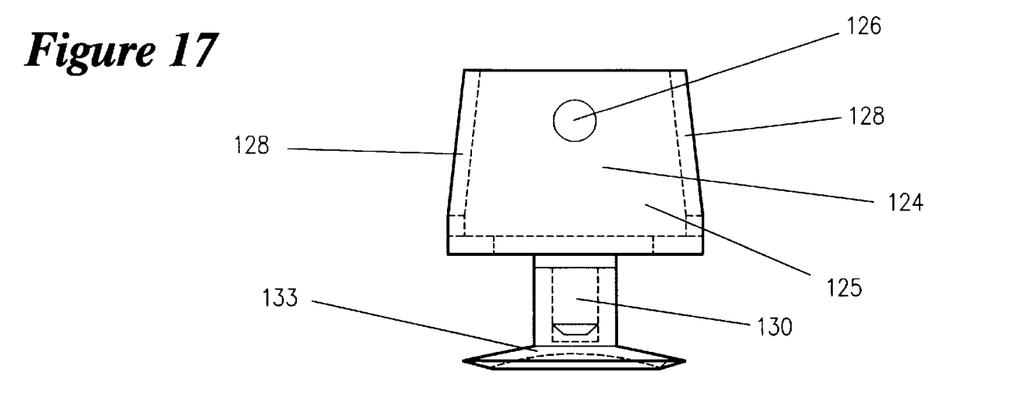
FIG. 17 is an enlarged top plan view of the suction cup bracket of FIG. 5 with the suction cup in place on the bracket.

The hook bracket also called a pin bracket because the front pointed member 88(a) can be straight is disclosed in FIGS. 14 through 16. As these figures demonstrate, the pin bracket incorporates an insert similar to the previously discussed insert allowing the user to screw in a pin or a hook. The bracket has a tapered front face 114, an extension block 116 integrally formed therewith which holds insert 100 which contains threaded thoroughgoing aperture 102. The axis of the aperture 102 is preferably parallel to the planar surface designated 101 in FIG. 16. A pair of shortened side walls 128 on either side of the back plate 124 help reinforce the bracket structurally. The back plate 124 defines aperture 126 so that the bracket can be pivotally or slidably attached to the tape adapter. The pin or hook member comprises a straight or curved hardened metal structure with a pointed proximal end to piece objects to anchor the end of the tape and a threaded distal end to facilitate engagement of the structure with the aperture 102 in the bracket. The hook member or pin can be straight, or have various degrees of curvature and lengths. The preferred material for this bracket is a high impact A.B.S. plastic with optional U.V. stabilizers. The bracket has a gloss finish (SPCI-2 to SPCI-3) except on the surface designated 101 which has a matt finish with approximately the equivalent of a 220 grit abrasive paper.

Figure 18:
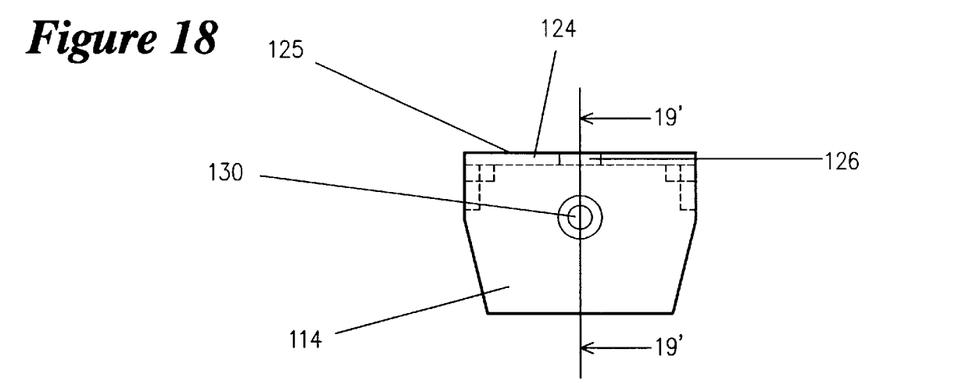
FIG. 18 is an enlarged front elevational view of the suction cup bracket shown in FIG. 17 with the suction cup removed.
Figure 19:
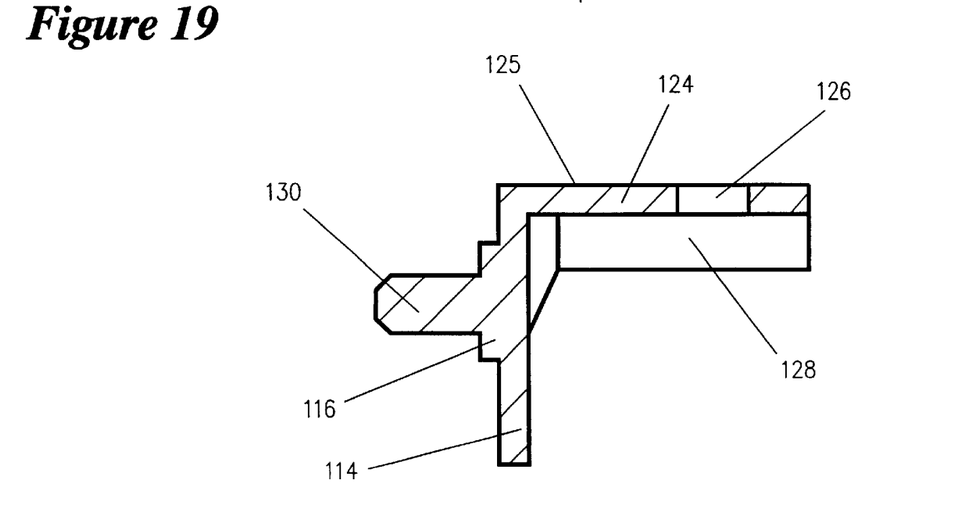
FIG. 19 is an enlarged cross section view of the suction cup bracket without the suction cup in place on the bracket taken along the line 19'—19' FIG. 18.
Figure 20:
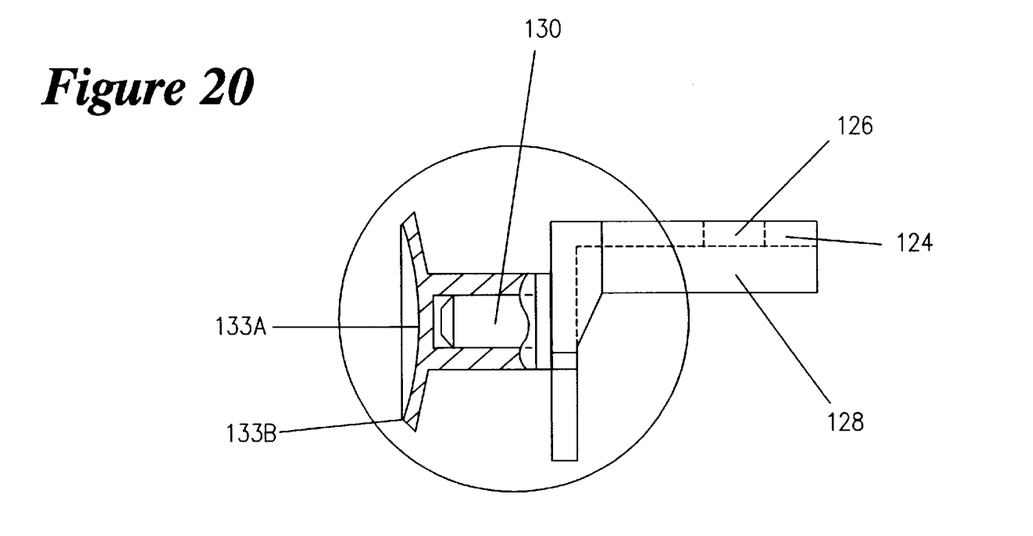
FIG. 20 is an enlarged partially cut away side elevational view of the suction cup bracket with the suction cup in place on the bracket.
Figure 21:
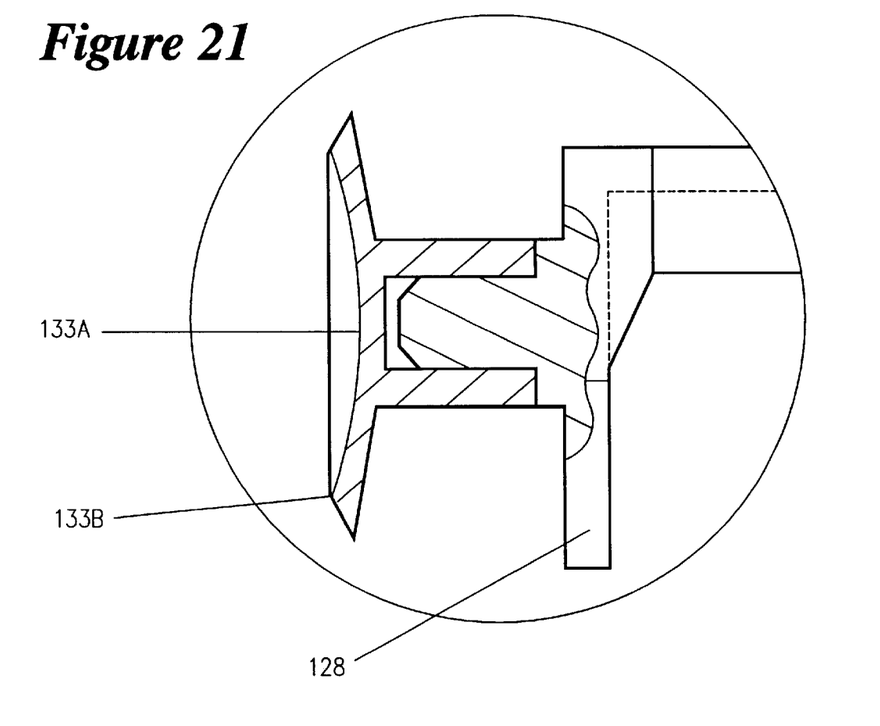
FIG. 21 is an enlarged partially cut away side elevational view of the circled portion of the suction cup bracket and suction cup shown in FIG. 20.
Figure 22:
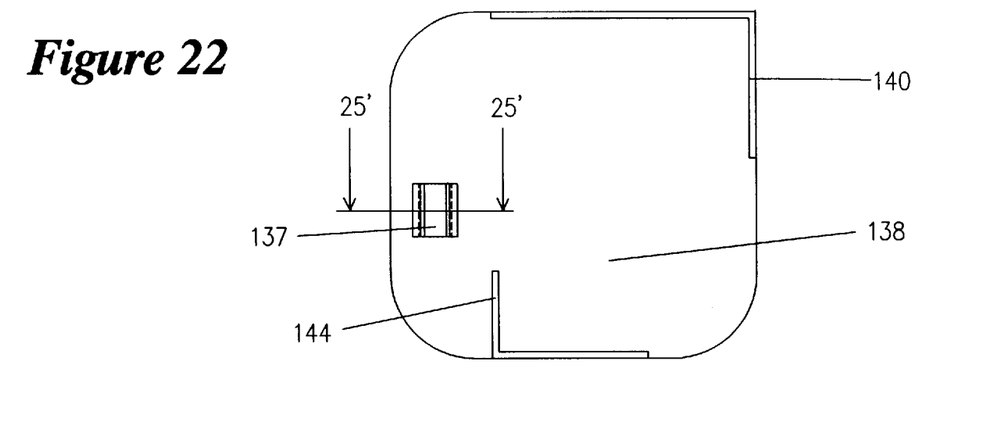
FIG. 22 is a top plan view of the note pad and writing implement holder.
Figure 23:
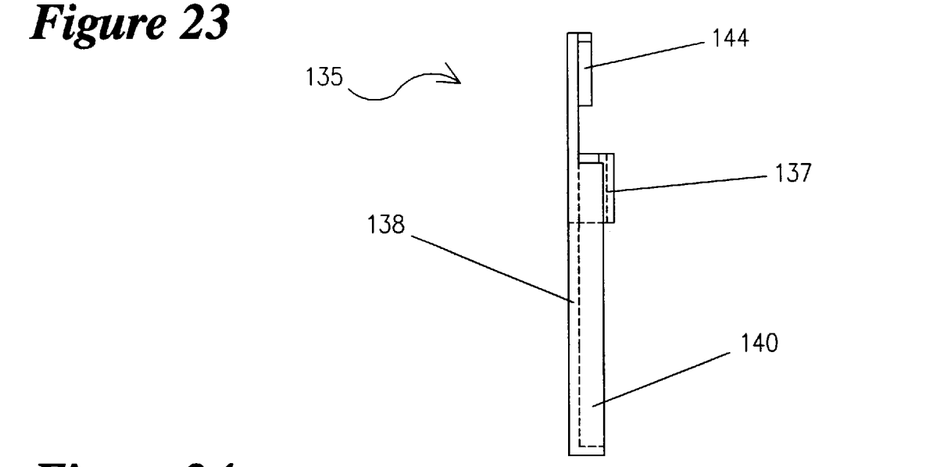
FIG. 23 is a side elevational view of the holder shown in FIG. 22.
Figure 24:
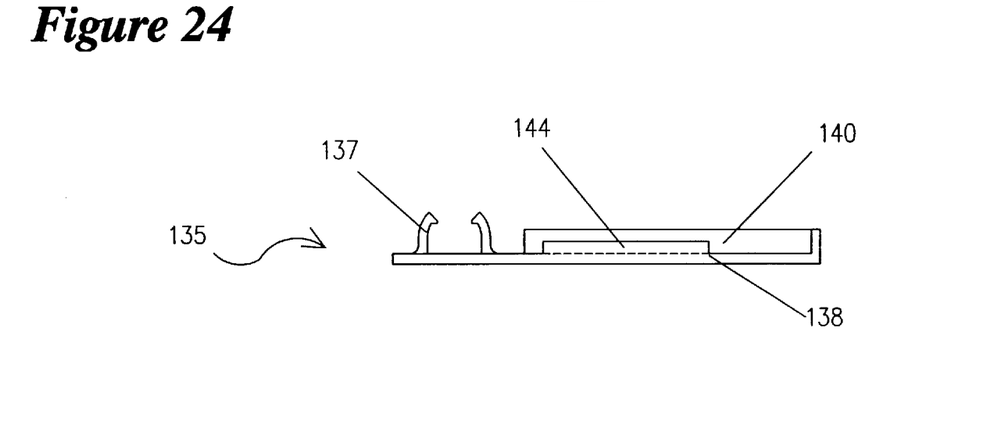
FIG. 24 is a front elevation view of the holder shown in FIG. 22.

FIGS. 17 through 21 disclose the suction cup assembly bracket. The tapered front face 114 as best shown in FIG. 18 has an extension block 116 which holds the integrally formed suction cup holder 130. The bracket is provided with back plate 124 defining aperture 126, and shortened side walls 128. The suction cup 133 is preferably made from santoprene thermoplastic rubber or the equivalent thereof with a hardness equal to 55 shore A and the suction cup should have a smooth surface on its inner face 133a with no radius on the edge of the cup portion. The cup portion is required to have a sharp corner 133b. The suction cup bracket is made of a high impact A.B.S. plastic with optional U.V. stabilizers. This bracket has a preferred gloss finish except for the surfaces designated 125 which have a matt finish. This matt finish specified for this surface is approximately the equivalent of 220 grit abrasive paper.

The adapter is pivotally joined to one of the brackets so that the surface 37 of the adapter shown in FIG. 7 is against either surface 66 of the knife bracket, surface 101 of the pin bracket or surface 125 of the suction cup bracket. The nut is then tightened so that the two units will not move relative to one another while the measurement is being taken and the assembly is secured to the appropriate surface to allow the measurement to be taken. Alternatively, the nut can be loosened so that the surfaces slide across one another to enable the tape measure user to extend the tape angularly from the point at which it is anchored. The base plate 38 of the adapter is placed in contact with the top plate 65 of one of the brackets 50, 52 or 54 and the bolt 57 is placed through aperture 48 on the adapter and aperture 67 on one of the brackets and the two pieces are pivotally or slidably conjoined by tightening the wing nut 58. The wing nut 58 can be loosened to enable the user to measure angularly from the point of attachment of one of the brackets.

Figure 25:
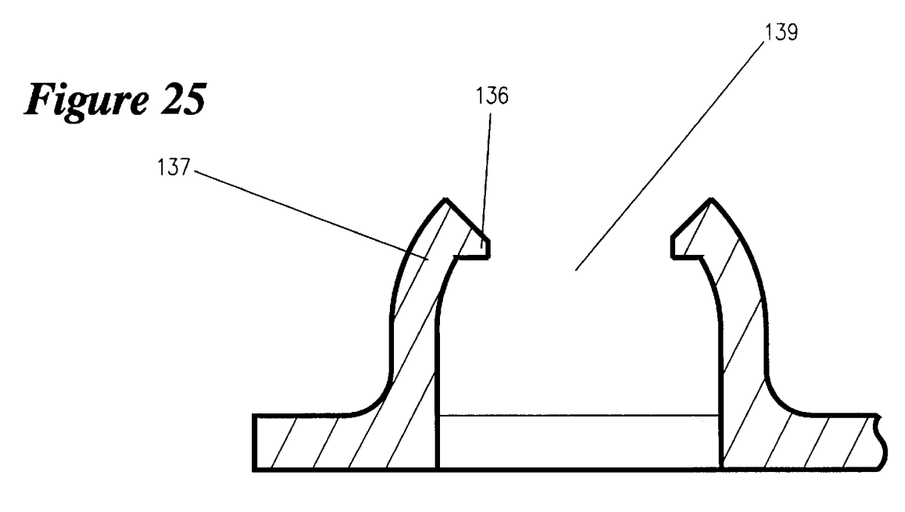
FIG. 25 is an enlarged view of the pencil holder taken along the line 25'—25' of FIG. 22; and, FIG. 26 is another embodiment of the pencil and pad holder device with a pencil sharpener.
Figure 26:
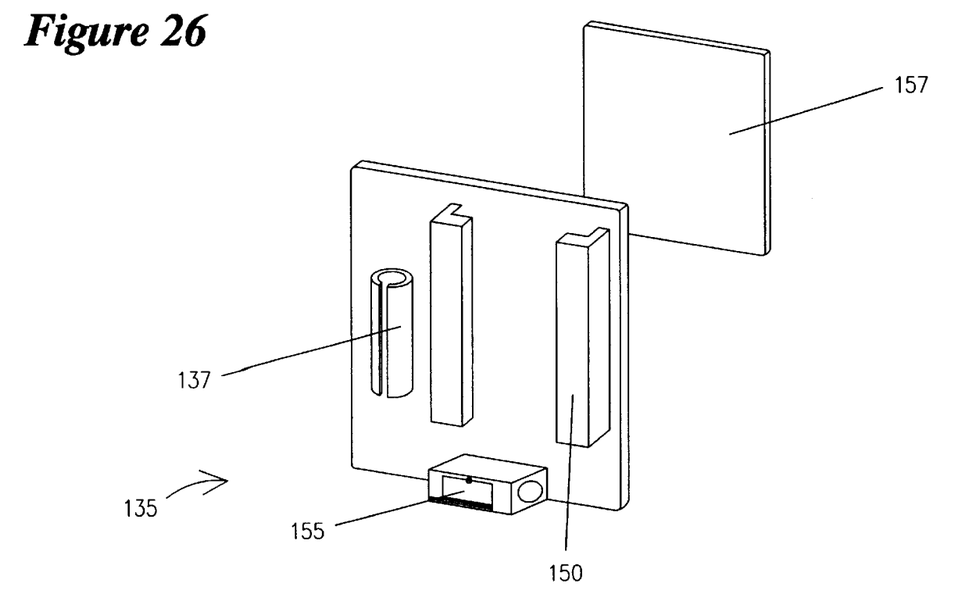

An embodiment of the inventive note pad holder is shown in FIGS. 22 through 26. The pad holder 135, has a planar base pad member 138 to which is affixed a pencil holder 137 and a plurality of pad brackets. The planar base member 138 has one ninety degree corner and three rounded corners. The upper pad brackets 140 are comprised of a pair of planar flanges which are coextensive with a portion of the edge of the planar pad member 138 and which cooperate to form a corner guide for placing a self adhesive pad to the planar pad member 138. The lower pad brackets 144 are a pair of mutually orthogonal planar flange members comprised of a long flange member coextensive with the edge of the planar member 138 and a short flange member perpendicular to the edge of the planar member. These flanges cooperate to form a lower guide means on the planar surface for installing a pad. The pencil holder 137 is comprised of a pair of opposed curved planar members with an accurate cross section forming a partially enclosed area 139 as best seen in FIG. 25. The ends of the members have identical hooks members 136 facing the enclosed area to retain the pencil or writing implement. The holder 137 is made of a resiliently flexible material so that the pencil can be pressed into and pulled out of place without damaging the pencil or the holder. The preferred material for the pad holder is a high impact A.B.S. plastic with an SPCI-2 or SPCI-3 gloss finish. Another pad holder embodiment is shown in FIG. 26 and includes a pair of pad brackets 150 forming a pad slot, a pencil holder 137 and a pencil sharpener 155. The pad holder is affixed to the side housing of the tape measure by means of an adhesive pad 157. This embodiment and the previous embodiment of the pad can be easily mounted to the side of any standard 10, 12, 16 feet, or 25 feet or larger tape measure housing.

In the forgoing description, the invention has been described with reference to a particular preferred embodiment, although it is to be understood that specific details shown are merely illustrative, and the invention may be carried out in other ways without departing from the true spirit and scope of the following claims:

I claim:

1. A tape adapter with a detachable bracket, comprising:
   a tape adapter comprising a base, a front face wall secured to one end of said base, a plurality of side walls secured to said base and said front face wall and a back wall secured to said base and said side walls to form a chamber for receiving a tape blade of a tape measure;
   a detachable bracket comprising a bracket plate and a flange member secured thereto extending away from said bracket plate substantially perpendicular to the plane of said bracket plate;
   means for pivotally attaching said bracket plate of said detachable bracket to the base of said tape adapter; and
   means for securing the measuring tape blade of the tape measure inside the chamber defined by said tape adapter walls to attach said tape adapter to the tape measure blade.

2. A tape adapter with a detachable bracket as claimed in claim 1 wherein said means for securing the measuring tape blade inside the chamber defined by said tape adapter walls comprises a self tapping screw extending through the front face wall of said adapter and biasing against the tape blade to keep it in a fixed position.

3. A tape adapter with a detachable bracket as claimed in claim 1 wherein said means for securing the measuring tape blade inside the chamber defined by said tape adapter walls comprises a threaded bore extending through the front face wall of said adapter and a threaded fastener passing through said threaded bore and biasing against the tape blade to keep it in a fixed position.

4. A tape adapter with a detachable bracket as claimed in claim 3 wherein said threaded bore is fabricated from a metal portion and the rest of said tape adapter is fabricated from a resilient plastic material.

5. A tape adapter with a detachable bracket as claimed in claim 4 wherein said resilient plastic material is a high impact A.B.S. plastic.

6. A tape adapter with a detachable bracket as claimed in claim 4 further comprising a plurality of metal hexagonal planar members where each of said hexagonal planar members is attached to an end of said threaded metal bore such that said planar members are perpendicular to the longitudinal axis of said threaded bore and wherein each of said hexagonal planar member is in direct contact with said front face wall.

7. A tape adapter with a detachable bracket as claimed in claim 1 further including a suction cup member attached to a front surface of said detachable bracket flange member.

8. A tape adapter with a detachable bracket as claimed in claim 1 further including a knife bracket means attached to a front surface of said detachable bracket flange member, said knife bracket means defining a knife blade slot.

9. A tape adapter with a detachable bracket as claimed in claim 8 wherein said knife bracket means comprises a blade guide plane member disposed on the front of said detachable bracket flange member so that the top of said blade guide plane member is secured to the top of said detachable bracket flange member and the bottom of said blade guide plane member is secured to the bottom of said detachable bracket flange member to form a slot across the front of said detachable bracket to hold and guide the blade.

10. A tape adapter with a detachable bracket as claimed in claim 1 further including a hook member removably attached to a front surface of said detachable bracket flange member.

11. A tape adapter with a detachable bracket as claimed in claim 1 further including a pin member attached to a front surface of said detachable bracket flange member.

12. A tape adapter with detachable bracket as claimed in claim 1 wherein the distal end of the base of said tape adapter and the distal end of the bracket plate of said detachable bracket are each provided with an aperture and wherein said means for pivotally attaching comprises a bolt extending through each of said apertures and a nut disposed on said bolt to hold the base and the bracket plate together.

13. A tape adapter with detachable bracket as claimed in claim 12 wherein one surface of said base and one surface of said bracket plate are each provided with a gritty surface such that when said bracket plate and said base are held together the gritty surfaces are in contact with one another.

14. A tape adapter with a detachable bracket, comprising:
   a tape adapter comprising a base member with a planar surface, wall means secured to the proximal end of said base member defining a chamber at the proximal end of said base member for receiving a tape blade of a tape measure; said base member defining a thoroughgoing aperture, therein;
   a detachable bracket removably mounted to said tape adapter comprising a bracket plate defining a planar surface and a flange member orientated substantially perpendicular to the plane defined by said bracket plate, said bracket plate defining a thoroughgoing aperture;
   fastening means extending through said base member and bracket plate aperture for pivotally attaching the planar surface of said bracket plate to the planar surface of said base member, and
   means for securing the measuring tape blade of a tape measure inside the chamber defined by said wall means.

15. A tape adapter as claimed claim 14 further comprising a pin member removably mounted to a front surface of said detachable bracket flange member.

16. A tape adapter with a detachable bracket as claimed in claim 14 further comprising a suction cup assembly secured to a front surface of said detachable bracket flange member.

* * * * *